(12) United States Patent
Curtis

(10) Patent No.: US 8,100,619 B2
(45) Date of Patent: Jan. 24, 2012

(54) CORNER-CUT CORRUGATED FASTENER

(75) Inventor: Patrick J. Curtis, Glen Ellyn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 169 days.

(21) Appl. No.: 12/420,512

(22) Filed: Apr. 8, 2009

(65) Prior Publication Data
US 2010/0260579 A1    Oct. 14, 2010

(51) Int. Cl.
*F16B 15/00* (2006.01)
(52) U.S. Cl. .......................... 411/477; 411/462
(58) Field of Classification Search .............. 411/461, 411/462, 464, 465, 477, 478
See application file for complete search history.

(56) References Cited

U.S. PATENT DOCUMENTS

| | | |
|---|---|---|
| 29,957 A | 9/1860 | Duryea |
| 300,536 A | 6/1884 | Walker |
| 366,269 A | 7/1887 | Starr |
| 376,236 A | 1/1888 | Collins |
| 396,900 A | 1/1889 | Starr |
| 406,545 A | 7/1889 | Starr |
| 412,981 A * | 10/1889 | Sanford ............... 411/477 |
| 419,375 A | 1/1890 | Starr |
| 461,154 A | 10/1891 | Welteroth |
| 515,168 A | 2/1894 | Rasner |
| 525,748 A | 9/1894 | Starr |
| 528,569 A | 11/1894 | Starr |
| 547,093 A | 10/1895 | Starr |
| 553,886 A | 2/1896 | Wyland |
| 595,000 A | 12/1897 | Wyland |
| 667,814 A | 2/1901 | Wyland |
| 753,950 A | 3/1904 | Wyland |
| 725,375 A | 4/1908 | Stambach |
| 988,621 A | 4/1911 | Body |
| 1,095,683 A | 5/1914 | Stambach |
| 1,129,968 A | 3/1915 | Englert |
| 1,169,124 A | 1/1916 | Cary |
| 1,182,201 A * | 5/1916 | Norton ............... 411/465 |
| 1,208,255 A | 12/1916 | Williams |
| 1,262,839 A | 4/1918 | Prindle |
| 1,295,268 A | 2/1919 | Cary et al. |

(Continued)

FOREIGN PATENT DOCUMENTS

GB    160033 A    3/1921

(Continued)

OTHER PUBLICATIONS

Notification of Transmittal of the International Search Report and the Written Opinion in the European Patent Office, dated Jul. 21, 2010.

*Primary Examiner* — Gary Estremsky
(74) *Attorney, Agent, or Firm* — Setter Roche LLP

(57) ABSTRACT

A corner-cut corrugated fastener in accordance with the principles of the invention includes one or more features to facilitate fastening corner joints. The corrugated fastener includes a corrugated body member having a leading edge and a trailing edge opposite the leading edge. The corrugated body member may have a notch along the trailing edge, or chamfers at opposing ends of the leading edge, or both a notch along the trailing edge and chamfers at opposing ends of the leading edge. Additionally or alternatively, the corrugated body member may include a corrugation that extends a full length of each lateral edge extending between the leading edge and the trailing edge in order to provide enhanced strength.

14 Claims, 3 Drawing Sheets

U.S. PATENT DOCUMENTS

| | | | | |
|---|---|---|---|---|
| 1,320,303 | A | 10/1919 | Young | |
| 1,328,911 | A | 1/1920 | Cary | |
| 1,737,908 | A | 12/1929 | Beegle | |
| 1,904,288 | A | 4/1933 | McChesney | |
| 1,925,238 | A | 9/1933 | Faries et al. | |
| 1,959,360 | A * | 5/1934 | Heyser | 403/280 |
| 2,035,817 | A | 3/1936 | Lloyd | |
| 2,046,337 | A | 7/1936 | McChesney | |
| 2,046,338 | A | 7/1936 | McChesney | |
| 2,046,339 | A | 7/1936 | McChesney | |
| 2,080,962 | A | 5/1937 | Febrey | |
| 2,155,893 | A * | 4/1939 | Fulton | 403/243 |
| 2,156,682 | A | 5/1939 | Dimoush | |
| 2,223,596 | A | 12/1940 | Bowman, Jr. | |
| 2,235,300 | A | 3/1941 | Ramey | |
| 2,273,507 | A | 2/1942 | Beegle | |
| 2,273,508 | A | 2/1942 | Beegle | |
| 2,287,964 | A | 6/1942 | Beegle | |
| 2,300,767 | A | 11/1942 | Beegle | |
| 2,370,452 | A | 2/1945 | Dixon | |
| 2,377,169 | A | 5/1945 | Mohr | |
| 2,495,337 | A | 1/1950 | Lindham | |
| 2,558,231 | A | 6/1951 | Beegle | |
| 2,942,267 | A | 6/1960 | Cusumano | |
| 3,082,658 | A | 3/1963 | Young | |
| 3,094,748 | A | 6/1963 | Sanford | |
| 3,211,043 | A | 10/1965 | Sanford | |
| 3,212,389 | A | 10/1965 | Sanford | |
| 3,507,384 | A | 4/1970 | Lippitt | |
| 3,726,397 | A | 4/1973 | Springer | |
| 3,828,401 | A * | 8/1974 | Poyak | 411/477 |
| 4,221,153 | A * | 9/1980 | Medina | 411/442 |
| 4,514,126 | A * | 4/1985 | Knowles | 411/477 |
| 4,681,498 | A | 7/1987 | Raffoni | |
| 4,718,804 | A | 1/1988 | Cassese | |
| 5,193,959 | A | 3/1993 | Motta | |
| 5,333,979 | A | 8/1994 | Raffoni | |
| 5,336,038 | A | 8/1994 | Raffoni | |
| 5,704,751 | A | 1/1998 | Kozyrski et al. | |
| 5,758,812 | A | 6/1998 | Raffoni | |
| 6,241,445 | B1 * | 6/2001 | Godsted | 411/478 |
| 6,276,886 | B1 | 8/2001 | Raffoni | |
| 6,286,570 | B1 | 9/2001 | Murray et al. | |
| 6,318,943 | B2 | 11/2001 | Joyce | |
| 6,679,669 | B2 | 1/2004 | Masa | |

FOREIGN PATENT DOCUMENTS

GB  2027152 A  2/1980

* cited by examiner

CORNER-CUT CORRUGATED FASTENER

FIELD OF THE INVENTION

This invention relates to a corrugated fastener that is particularly suitable for joining two perpendicular pieces of material.

BACKGROUND OF THE INVENTION

Corrugated fasteners are generally rectangular-shaped fasteners having alternating ridges and grooves, or corrugations, that are used to join pieces of wood or other materials. Corrugated fasteners are widely used in applications involving miter and butt joints, such as in the manufacture of cabinetry, furniture, and picture frames, as well as in vinyl siding, pallet, and truss assemblies. In many applications, corrugated fasteners are used as a substitute for nails where nails may split the wood.

When joining two pieces of wood in a perpendicular arrangement, such as in the manufacture of cabinets, corrugated fasteners can be used to secure the pieces together. Ideally, a corrugated fastener should be driven into the material fully, without any portion of the fastener being exposed. However, if the wood is too thin or the fastener is too long or too wide, when the corrugated fastener is driven into a corner, the fastener may remain exposed inside the corner of the cabinet and/or the corners of the fastener may be pushed through an outside surface of the cabinet. The exposed fastener appears sloppy. Furthermore, an exposed leading edge of the fastener is sharp and is liable to cause injury to anyone who happens to brush against it.

One solution for preventing fastener exposure in a corner application is to use a smaller fastener. However, a fastener that does not penetrate the material deeply enough will not prevent the joint from separating or becoming misaligned.

To provide a strong and stable connection between adjoining pieces of wood or other material, it is ideal to maximize the size of the corrugated fastener without the fastener being exposed on either the inside surface or outside surface of the joined pieces.

There is a need or desire for a corrugated fastener that can be used to join two perpendicular pieces of material such that the fastener can deeply penetrate the material in a corner formed by the two pieces without any edges of the fastener being exposed on either an inside surface or outside surface of the two materials.

SUMMARY OF THE INVENTION

A corrugated fastener in accordance with the principles of the invention can be used in a variety of applications and, in particular, can be installed in a corner formed by joining two perpendicular pieces of material without any edges of the installed fastener being exposed.

The corrugated fastener includes a corrugated body member having a leading edge configured to facilitate penetration of the fastener into wood or other material. The corrugated body member also has a trailing edge opposite the leading edge.

In certain embodiments, the corrugated fastener may include a "corner cut" in the form of a notch along the trailing edge. This notch can be V-shaped, with an angle between about 80 and 100 degrees, or curvilinear, for example, to accommodate an inner surface of a corner into which the fastener is driven. The notch may be centered along the trailing edge.

In certain embodiments, the corrugated fastener may include "corner cuts" in the form of chamfers at opposing ends of the leading edge. The chamfers may be at an angle between about 40 and 80 degrees with respect to the leading edge, thus preventing exposure of the opposing ends of the leading edge through an outer surface of the corner into which the fastener is driven. The chamfers may be formed by either straight or curvilinear edges. Furthermore, the corrugated body member may have two opposing lateral edges, each extending between the leading edge and the trailing edge, with each lateral edge including a positioning notch. Each of the chamfers may extend from the leading edge to the positioning notch.

In certain embodiments, the corrugated fastener may include "corner cuts" in the form of both a notch along the trailing edge and chamfers at opposing ends of the leading edge.

In certain embodiments, the corrugated fastener may include a corrugation that extends a full length of each lateral edge, such that each lateral edge is non-planar with the corrugated body member in general. In these embodiments, the corrugated fastener may optionally include any corner cuts in the form of a notch along the trailing end and/or chamfers at opposing ends of the leading edge.

In any case, the corrugated body member may include two or more corrugations extending between the leading edge and the trailing edge. These corrugations may either be parallel or may converge toward the trailing edge. Additionally, the leading edge may include at least one beveled surface to facilitate penetration of the fastener into wood or other material. The corrugated fastener may be joined to other corrugated fasteners of the same design in a strip for use in a fastener installation tool.

This invention will become more fully understood from the following detailed description, taken in conjunction with the accompanying drawings described herein below, and wherein like reference numerals refer to like parts.

DESCRIPTION OF PREFERRED EMBODIMENTS

Figure 1:
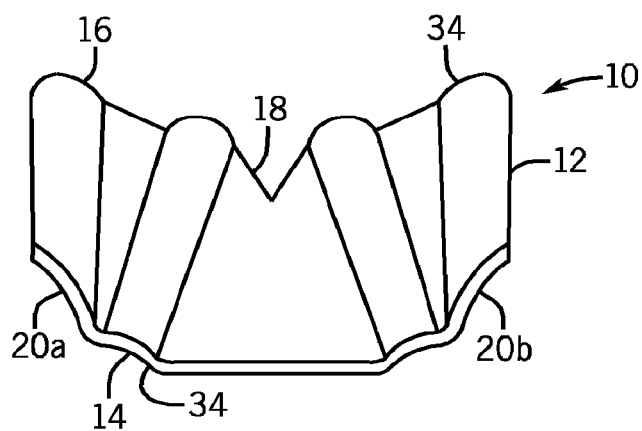
FIG. 1 illustrates a perspective view of one embodiment of a corner-cut corrugated fastener.

A corner-cut corrugated fastener 10 is illustrated in FIG. 1. The corner-cut corrugated fastener 10 includes one or more cut-out portions to facilitate the use of the corrugated fastener 10 in a corner joint application.

The corrugated fastener 10 includes a generally rectangular corrugated body member 12 having a leading edge 14 and a trailing edge 16 opposite the leading edge 14. The leading edge 14 is configured to enter the wood or other material before the trailing edge 16.

In at least one embodiment, the corrugated body member 12 has a notch 18 along the trailing edge 16 to reduce or eliminate exposure of the fastener 10 on an interior surface of a corner once the fastener 10 has been driven into two perpendicular pieces of material. In at least another embodiment, the corrugated body member 12 has chamfers 20a and 20b at opposing ends of the leading edge 14 to reduce or eliminate exposure of the fastener 10 on an outer surface of a corner once the fastener 10 has been driven into two perpendicular pieces of material. In the embodiment illustrated in FIG. 1, the corrugated body member 12 has both a notch 18 along the trailing edge 16 and chamfers 20a and 20b at opposing ends of the leading edge 14.

Figure 2:
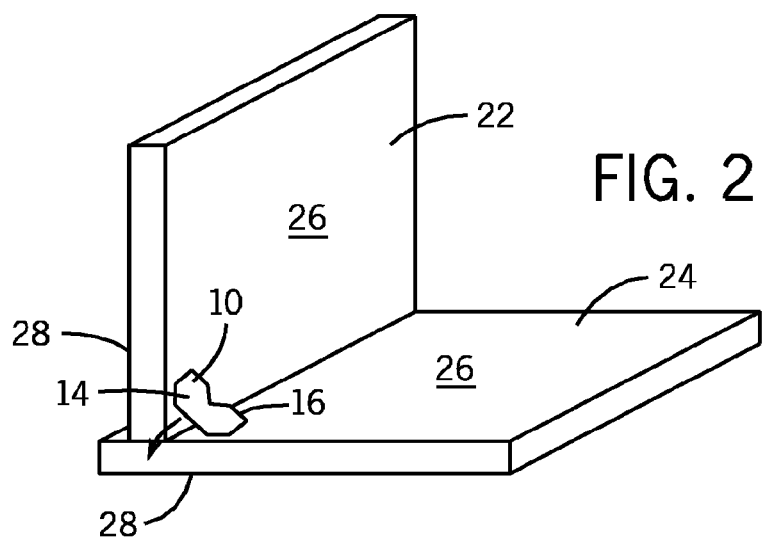
FIG. 2 illustrates a corner-cut corrugated fastener aligned for insertion into two perpendicular pieces of material.

FIG. 2 demonstrates the corrugated fastener 10 aligned to be driven into a corner formed by perpendicular arrangement of a side panel 22 and a face panel 24 of a cabinet assembly. One example of a suitable fastener installation tool that can be used to drive the fastener 10 into a corner joint is a DCF 670 Duo-Fast® Corrugator™, available from ITW Industrial Fastening.

Figure 3:
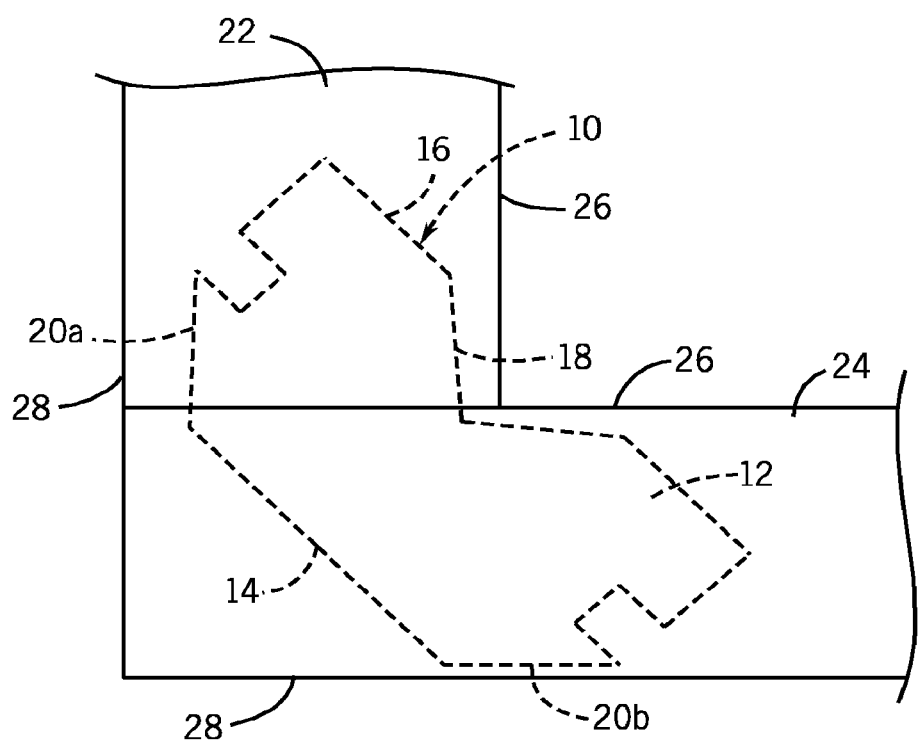
FIG. 3 illustrates a corner-cut corrugated fastener inserted within two perpendicular pieces of material.

FIG. 3 illustrates the corrugated fastener 10 joining the side panel 22 to the face panel 24. As shown, the notch 18 along the trailing edge 16 may be V-shaped, which conforms to the shape of the corner, thus obviating exposure of the fastener 10 on an interior surface 26 of the corner. For ease of use with fastener installation tools, the notch 18 is suitably centered along the trailing edge 16.

Also shown in FIG. 3, the chamfers 20a and 20b at opposing ends of the leading edge 14 conform to the shape of the corner as well, thus obviating exposure of the fastener on an outer surface 28 of the corner joint.

Figure 4:
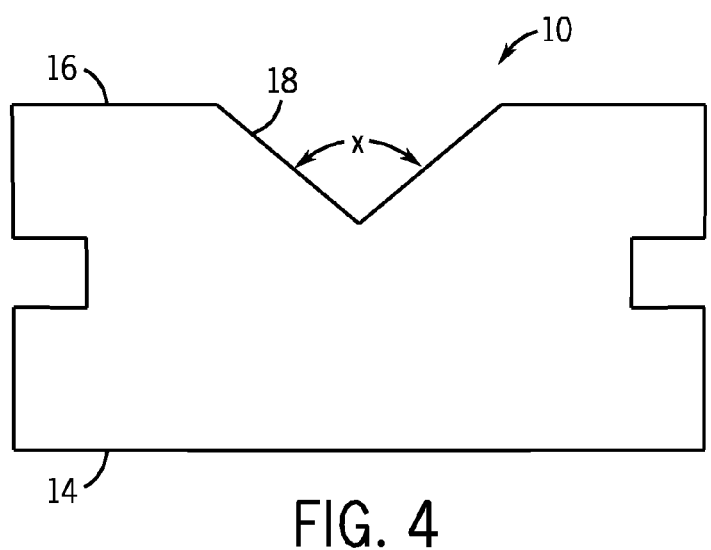
FIG. 4 illustrates another embodiment of a corner-cut corrugated fastener.
Figure 5:
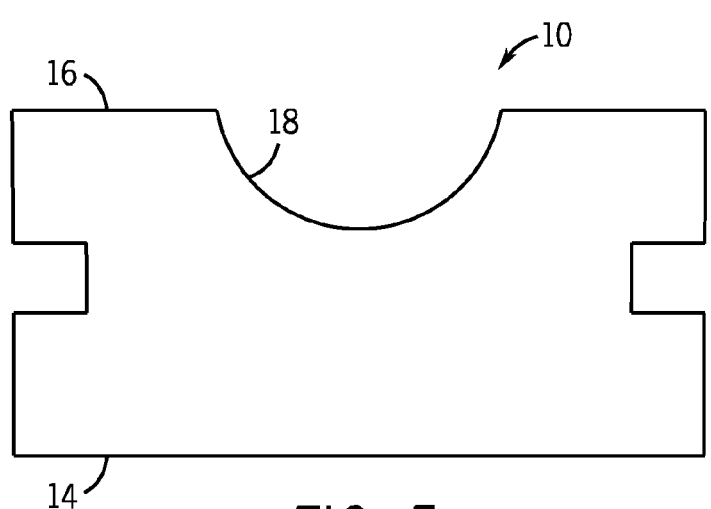
FIG. 5 illustrates yet another embodiment of a corner-cut corrugated fastener.
Figure 6:
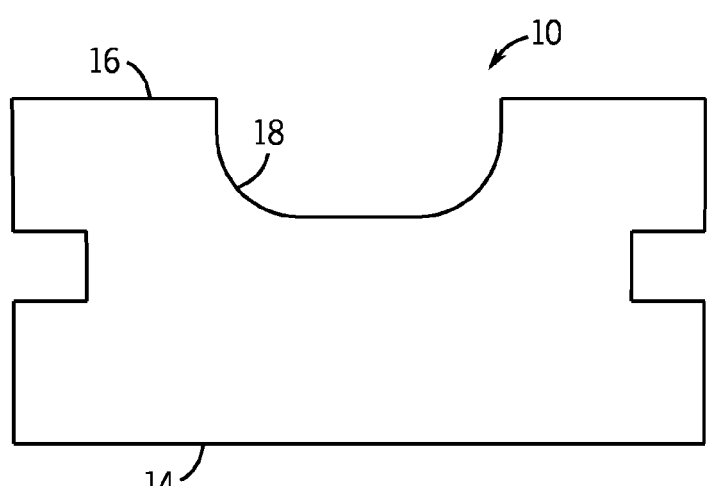
FIG. 6 illustrates still another embodiment of a corner-cut corrugated fastener.

The corrugated fastener 10 in FIG. 4 has the notch 18 along the trailing edge 16 with no chamfers along the leading edge 14. The notch 18 may have an angle x between about 80 and 100 degrees, such as 90 degrees, for example, which is particularly suitable for joining two pieces perpendicularly. Alternatively, the angle of the notch 18 may fall outside of this range for non-perpendicular corner joints, with a smaller angle of the notch 18 for two pieces forming an acute angle or a larger angle for the notch 18 for two pieces forming an obtuse angle. As yet another alternative, rather than being V-shaped, the notch 18 may be curvilinear, as either a full radius (as illustrated in FIG. 5) or as two partial radii flanking a flat edge (as illustrated in FIG. 6), for example.

Figure 7:
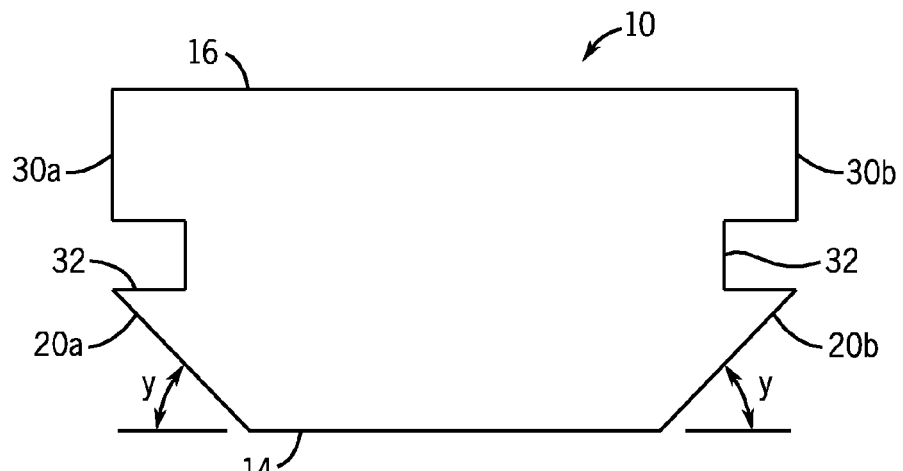
FIG. 7 illustrates a further embodiment of a corner-cut corrugated fastener.
Figure 8:
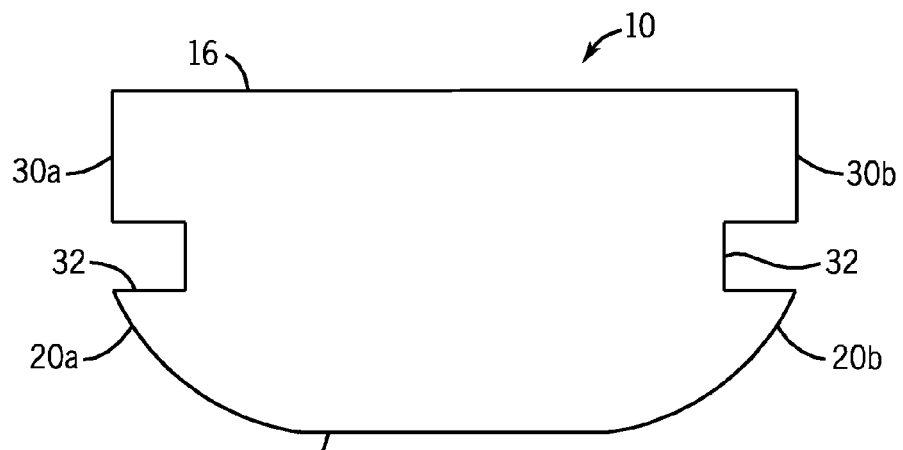
FIG. 8 illustrates an additional embodiment of a corner-cut corrugated fastener.

The corrugated fastener 10 in FIG. 7 has chamfers 20a and 20b at opposing ends of the leading edge 14 with no notch along the trailing edge 16. The chamfers 20a and 20b may be at an angle y between about 40 and 80 degrees, for example, with respect to the leading edge 14. In certain embodiments, as illustrated in FIG. 8, the chamfers 20a and 20b may be curvilinear. Along each of two opposing lateral edges 30a and 30b extending between the leading edge 14 and the trailing edge 16, the corrugated body member 12 may optionally include a positioning notch 32 for facilitating alignment of the corrugated fastener 10 with other like corrugated fasteners. In certain embodiments, each of the chamfers 20a and 20b may extend from the leading edge 14 to the respective positioning notch 32. Alternatively, the positioning notches 32 may be formed within the chamfers 20a and 20b.

Figure 9:
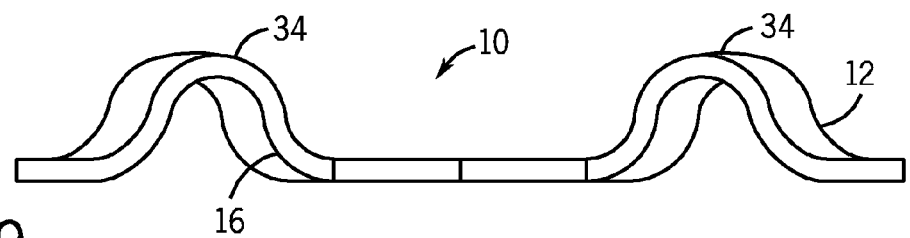
FIG. 9 illustrates a trailing end view of a corner-cut corrugated fastener.

To further improve the strength and stability of a joint, the corrugated fastener 10 may include two or more corrugations 34 extending between the leading edge 14 and the trailing edge 16, as illustrated in FIGS. 1 and 9. These corrugations 34 may either be parallel with one another or may be slightly angled with the corrugations 34 converging toward the trailing edge 16. With the corrugations 34 angled in this manner, the corrugations 34 draw the two pieces 22 and 24 together as they are joined, further reducing separation of the two pieces 22 and 24.

Figure 10:
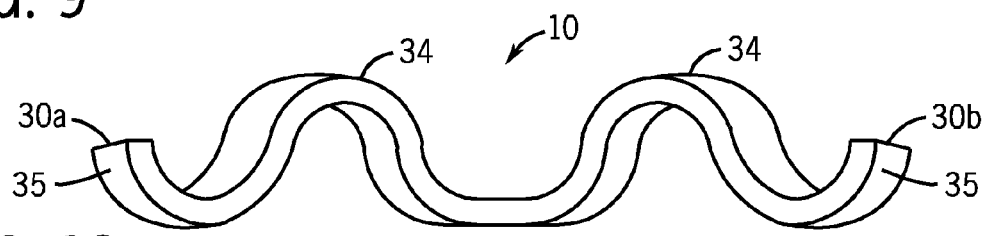
FIG. 10 illustrates a trailing end view of another embodiment of a corrugated fastener having outer edge corrugations.

To further enhance the strength of the joint, the corrugated fastener 10 may include outer edge corrugations 35, as illustrated in FIGS. 1 and 10. The edge corrugations 35 are similar to the corrugations 34 in the interior portion of the corrugated body member 12, but extend along a full length of each lateral edge 30a and 30b, thus enhancing the strength of the joint between the two pieces 22 and 24. As illustrated in FIG. 10, each lateral edge 30a and 30b having an edge corrugation 35 is non-planar with the corrugated body member 12 in general.

Figure 11:
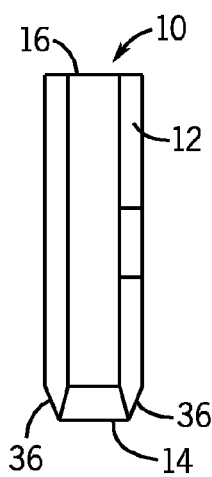
FIG. 11 illustrates a side view of a corner-cut corrugated fastener.

To facilitate entry of the leading edge 14 into the wood or other material, the leading edge 14 may include one or more beveled surfaces 36. For example, the corrugated fastener 10 illustrated in FIG. 11 has two beveled surfaces 36, which gives the leading edge 14 a sharpness that can easily penetrate the wood or other material during installation.

The corrugated body member 12 is formed generally of a metal in some forming operation known to those of ordinary skill in the art. The leading edge 14 and particularly the one or more beveled surfaces 36 thereof may be formed by known manufacturing processes, including for example grinding or skiving operations.

As mentioned above, the corrugated fastener 10 may be aligned with other like corrugated fasteners. More particularly, a plurality of the corrugated fasteners 10 may be collated or joined together in a strip and retained by frangible means as is known to those of ordinary skill in the art, whereby the strip is useable in a fastener installation tool.

While the corner joint illustrated and described herein is a butt joint between a side panel 22 and a face panel 24 of a cabinet assembly, the corrugated fastener 10 can be used in any of a wide range of applications involving butt joints as well as miter joints, including but not limited to the manufacture of cabinetry, furniture, and picture frames, as well as in vinyl siding, pallet, and truss assemblies. As illustrated and described herein, the features of the corner-cut corrugated fastener 10 allow the size of the fastener 10 to be maximized while simultaneously allowing the fastener 10 to more deeply penetrate the corner joint for enhanced strength and stability in connecting the adjoining pieces of material, compared to conventional corrugated fasteners, without any edges of the fastener 10 being exposed on either the inside surface or outside surface of the joined pieces.

It should be understood that various changes and modifications to the preferred embodiments described herein would be apparent to those skilled in the art. Such changes and modifications can be made without departing from the spirit and scope of the present invention and without demising its attendant advantages. It is therefore intended that such changes and modifications be covered by the appended claims.

What is claimed is:

1. A corrugated fastener comprising:
   a corrugated body member having a leading edge and a trailing edge opposite the leading edge;
   the corrugated body member having a notch along the trailing edge, wherein the notch is positioned between two straight edge portions on the trailing edge, and at least a portion of the leading edge includes a straight edge that is generally parallel with the two straight edge portions of the trailing edge.

2. The corrugated fastener of claim 1, wherein the notch is V-shaped.

3. The corrugated fastener of claim 1, wherein the notch has an angle between about 80 and 100 degrees.

4. The corrugated fastener of claim 1, wherein the notch is curvilinear.

5. The corrugated fastener of claim 1, wherein the notch is centered along the trailing edge.

6. The corrugated fastener of claim 1, wherein the corrugated body member further comprises chamfers at opposing ends of the leading edge.

7. The corrugated fastener of claim 1, wherein the corrugated body member has a plurality of corrugations extending between the leading edge and the trailing edge, with the corrugations converging toward the trailing edge.

8. The corrugated fastener of claim 1, wherein the leading edge comprises at least one beveled surface.

9. The corrugated fastener of claim 1, wherein the corrugated fastener is one of a plurality of corrugated fasteners joined together in a strip, whereby the strip is useable in a fastener installation tool.

10. A corrugated fastener comprising:
a corrugated body member having a leading edge and a trailing edge opposite the leading edge, and two opposing lateral edges each extending between the leading edge and the trailing edge, with each lateral edge including a positioning notch;
the corrugated body member having chamfers at opposing ends of the leading edge, wherein each of the chamfers extends from the leading edge to the respective positioning notch.

11. The corrugated fastener of claim 10, wherein the chamfers are at an angle between about 40 and 80 degrees with respect to the leading edge.

12. The corrugated fastener of claim 10, wherein the chamfers are curvilinear.

13. The corrugated fastener of claim 10, wherein the corrugated body member has a plurality of corrugations extending between the leading edge and the trailing edge, with the corrugations converging toward the trailing edge.

14. The corrugated fastener of claim 10, wherein the leading edge comprises at least one beveled surface.

\* \* \* \* \*